(12) United States Patent
De Luca et al.

(10) Patent No.: US 11,280,649 B2
(45) Date of Patent: Mar. 22, 2022

(54) SENSOR ASSEMBLY

(71) Applicant: Flusso Limited, Cambridge (GB)

(72) Inventors: Andrea De Luca, Cambridge (GB); Cerdin Lee, Trumpington (GB); Tim Butler, Cambridge (GB); Ethan Gardner, Kineton (GB); Florin Udrea, Cambridge (GB)

(73) Assignee: FLUSSO LIMITED, Cambridge (GB)

( * ) Notice: Subject to any disclaimer, the term of this patent is extended or adjusted under 35 U.S.C. 154(b) by 0 days.

(21) Appl. No.: 16/658,718

(22) Filed: Oct. 21, 2019

(65) Prior Publication Data

US 2021/0116278 A1    Apr. 22, 2021

(51) Int. Cl.
*G01F 1/684* (2006.01)

(52) U.S. Cl.
CPC ............ *G01F 1/684* (2013.01); *G01F 1/6842* (2013.01); *G01F 1/6845* (2013.01)

(58) Field of Classification Search
CPC ....... G01F 1/684; G01F 1/6842; G01F 1/6845
See application file for complete search history.

(56) References Cited

U.S. PATENT DOCUMENTS

| | | | |
|---|---|---|---|
| 4,548,078 A | 10/1985 | Bohrer et al. | |
| 5,404,753 A | 4/1995 | Hecht et al. | |
| 6,379,988 B1* | 4/2002 | Peterson | B81C 1/00333 |
| | | | 257/E21.502 |
| 6,460,411 B1 | 10/2002 | Kersjes et al. | |
| 8,418,549 B2 | 4/2013 | Speldrich et al. | |
| 8,695,417 B2 | 4/2014 | Speldrich et al. | |
| 9,003,877 B2 | 4/2015 | Qasimi et al. | |
| 9,091,577 B2 | 7/2015 | Speldrich et al. | |
| 10,107,662 B2 | 10/2018 | Cook et al. | |
| 2002/0069699 A1* | 6/2002 | Sato | G01F 1/684 |
| | | | 73/204.22 |
| 2004/0118218 A1 | 6/2004 | Mayer | |
| 2012/0186336 A1* | 7/2012 | Speldrich | G01F 1/6842 |
| | | | 73/201 |
| 2016/0161314 A1 | 6/2016 | Hunziker et al. | |
| 2018/0172493 A1 | 6/2018 | Speldrich et al. | |

FOREIGN PATENT DOCUMENTS

| | | |
|---|---|---|
| EP | 1717562 A1 | 11/2006 |
| EP | 2381225 A1 | 10/2011 |
| EP | 3032227 A1 | 6/2016 |

OTHER PUBLICATIONS

B. Van Oudheusden, "Silicon flow sensors," in Control Theory and Applications, IEE Proceedings D, 1988, pp. 373-380.
B. Van Oudheusden, "Silicon thermal flow sensors," Sensors and Actuators A: Physical, vol. 30, pp. 5-26, 1992.

(Continued)

*Primary Examiner* — Ryan D Walsh
(74) *Attorney, Agent, or Firm* — Tucker Ellis LLP

(57) ABSTRACT

We disclose herein a flow sensor assembly comprising a first substrate, a flow sensor located over the first substrate, a lid located over the flow sensor, a flow inlet channel, and a flow outlet channel. A surface of the flow sensor and a surface of the lid cooperate to form a flow sensing channel between the flow inlet channel and the flow outlet channel, and a surface of the flow sensing channel is substantially flat throughout the length of the flow sensing channel.

24 Claims, 7 Drawing Sheets

(56) References Cited

OTHER PUBLICATIONS

N. Nguyen, "Micromachined flow sensors—A review," Flow measurement and Instrumentation, vol. 8, pp. 7-16, 1997.
Y.-H. Wang et al., "MEMS-based gas flow sensors," Microfluidics and nanofluidics, vol. 6, pp. 333-346, 2009.
J. T. Kuo et al., "Micromachined Thermal Flow Sensors—A Review," Micromachines, vol. 3, pp. 550-573, 2012.
International Partial Search Report from corresponding International Application No. PCT/EP2020/078299, dated Jan. 19, 2021, 10 pages.

* cited by examiner

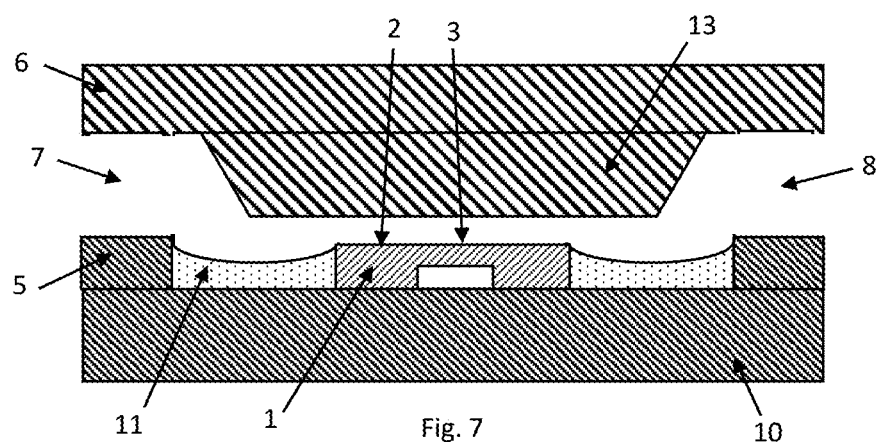
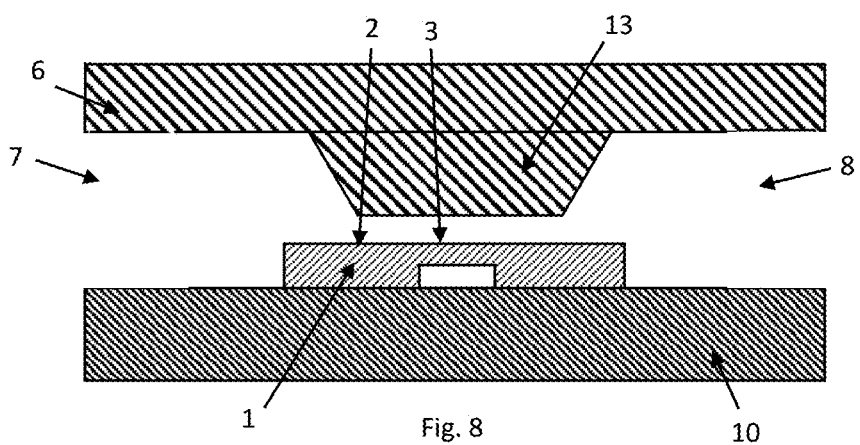
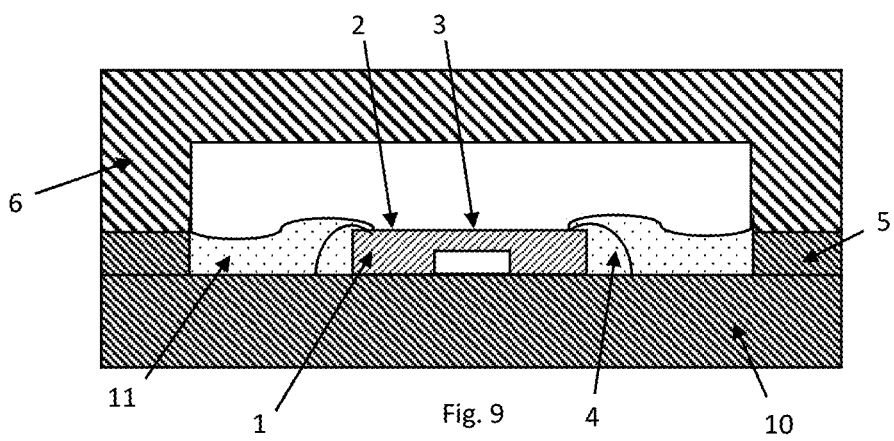

SENSOR ASSEMBLY

TECHNICAL FIELD

This present disclosure relates to a fluid flow sensor assembly, particularly but not exclusively, the disclosure relates to a miniaturised fluid flow sensor assembly with reduced turbulences and manufacturable in very high volumes at low unit cost.

BACKGROUND

Thermal fluid flow sensors utilise the thermal interaction between the sensor itself and the fluid. Depending upon the physical phenomena governing the interaction, flow sensors can be can be classified into the following three categories:
  (i) anemometric sensors that measure the convective heat transfer induced by fluid flow passing over a heated element;
  (ii) calorimetric sensors that detect the asymmetry of the temperature profile generated by a heated element and caused by the forced convection of the fluid flow; and
  (iii) time of flight (ToF) sensors that measure the time elapsed between the application and the sensing of a heat pulse.

Reviews of thermal fluid flow sensor have been published in (B. Van Oudheusden, "Silicon flow sensors," in Control Theory and Applications, IEE Proceedings D, 1988, pp. 373-380; B. Van Oudheusden, "Silicon thermal flow sensors," Sensors and Actuators A: Physical, vol. 30, pp. 5-26, 1992; N. Nguyen, "Micromachined flow sensors-A review," Flow measurement and Instrumentation, vol. 8, pp. 7-16, 1997; Y.-H. Wang et al., "MEMS-based gas flow sensors," Microfluidics and nanofluidics, vol. 6, pp. 333-346, 2009; J. T. Kuo et al., "Micromachined Thermal Flow Sensors-A Review," Micromachines, vol. 3, pp. 550-573, 2012). Further background can also be found in U.S. Pat. No. 6,460,411 by Kersjes et al.

Generally, a flow sensor assembly comprises a sensing die, a substrate and a housing. In most cases, the housing comprises a flow channel with an inlet and an outlet. The channel is a fluidic element responsible for driving the fluid across the sensing die. The design of the flow channel strongly affects the performance of the flow sensing assembly (e.g. range, accuracy, noise, etc.). Some ways of improving flow laminarity, or more generally a well-controlled flow, include:
  (i) designing the flow channel long enough to achieve a fully developed flow, so not to have turbulences and a well-defined flow profile independently of the flow profile at the inlet of the channel;
  (ii) designing the flow channel with a restrictor above the sensing surface to increase the flow velocity across the sensor and stimulate flow profile re-development;
  (iii) designing the flow channel with restrictors away from the sensing surface to increase fluid impedance and have a flow velocity profile across the sensor more independent from the inlet flow profile;
  (iv) designing the flow channel with smooth surfaces and corners to avoid the onset of turbulences;
  (v) designing the flow channel with means (e.g. turns, reservoirs, etc.) to avoid the interaction and accumulation of particles (e.g. dust) on or in proximity of the flow sensing surface.

Electrical connections (e.g. bond wires) to the flow sensing die are often used. These connections can interfere with the fluid flow creating unwanted turbulences. Additionally, the fluid might mechanically and chemically interact with the interconnections, leading to their failure. Precautions for the protection of the connections may be taken into account.

The implementation of the aforementioned approaches can prove to be extremely challenging when the flow sensor assembly has a tiny form factor (e.g. sub-centimetre). This can be because there is not enough space to physically implement the solution or the technologies to implement the solution are too expensive for a product targeting high volume low cost consumer markets.

There are four assembly strategies used in the state-of-the-art, as shown in FIGS. 1A to 1D:
  in FIG. 1A the flow sensing die and electrical connections are exposed to fluid flow in the flow channel;
  in FIG. 1B the flow sensing area of the flow sensing die is exposed to fluid flow in the flow channel and the electrical connections are isolated from the flow sensing channel in a secondary volume;
  in FIG. 10 the flow sensing die is assembled to be at the same level as the substrate surface within a cavity in the substrate and electrical connections exposed to fluid flow in the flow channel; and
  in FIG. 1D the flow sensing die is partly overmoulded in such a way to protect electrical connections. The overmoulding used overlaps the substrate. This is an inefficient use of substrate area.

In U.S. Pat. Nos. 5,404,753, 8,418,549, 8,695,417, 9,003,877, 9,091,577 flow sensor assemblies have the bond pads far away from the sensing structure to allow enough space for a wall separating the flow channel from the bond wires cavity. This approach results in large die size and limitation for flow sensor assembly miniaturisation.

In U.S. Pat. No. 10,107,662B2, US20040118218A1, US20180172493A1, and U.S. Pat. No. 4,548,078, the flow sensing die is sitting into a cavity to have the flow sensing die surface flush with one of the flow channel's walls. The presence of such cavity is detrimental for the flow profile.

In EP1717562A1, standard moulding technologies for generic semiconductor packaging are used. However, moulding requires high tooling costs, and the tooling is specific to a design. If the design has to be changed, new tooling is required. Also, moulding technologies require a certain clearance between the edge of the mould and the edge of the flow sensing structure (e.g. membrane) on the flow sensing surface of the flow sensing die. This poses limitations in terms of sensing die miniaturisation and ultimately flow sensor assembly form factor. Furthermore, the mould might bleed onto the flow sensing structure leading to device rejection at inspection stage. Thus, precautions have to be taken (e.g. tight control of the moulding process, tranches or walls on the die surface) to minimise the rejection rate. Precautions often come with additional process steps and associated risk and cost. Similar considerations apply to US20160161314A1.

SUMMARY

Aspects and preferred features are set out in the accompanying claims.

According to a first aspect of the present disclosure there is provided a flow sensor assembly comprising: a first substrate; a flow sensor located over the first substrate; a lid located over the flow sensor; a flow inlet channel; a flow outlet channel, wherein a surface of the flow sensor and a surface of the lid cooperate to form a flow sensing channel between the flow inlet channel and the flow outlet channel;

and wherein a surface of the flow sensing channel is substantially flat throughout the length of the flow sensing channel.

The flow sensor assembly provides a miniature fluid flow sensor assembly manufacturable in very high volumes at low unit cost, whereby the onset of turbulences is reduced in proximity to the flow sensing structure to increase the flow sensing performance while maintaining a miniaturised form factor.

The flow sensing channel may extend laterally through the device providing a fluid flow path laterally through the sensor assembly, past the flow sensor. The flow inlet channel, the flow outlet channel and the flow sensing channel together form the flow channel. The flow sensing channel may be defined as the whole length of the portion of the flow channel between the flow inlet channel and the flow outlet channel. In use, once flow has passed through the flow inlet it reaches the flow sensing channel which has a substantially flat surface. As a surface of the flow sensing channel is substantially flat, the fluid flow through the flow sensing channel flows parallel to the surface of the flow sensing channel and hits no or a reduced number of disturbances such as corners of the flow sensor (flow sensing die) within the flow sensing channel. The disclosed device therefore reduces turbulence through the sensor assembly, in particular around a flow sensing surface of the flow sensor, and improves the functionality of the flow sensor assembly.

Disturbances such as the corners of the flow sensor may be present within the flow sensor but outside the flow sensing channel, and therefore do not increase turbulence in the flow channel.

The surface of the flow sensing channel that is flat may be a first surface closest to the first substrate and defined by the flow sensor. The surface that is substantially flat may include the surface of the flow sensor and a region of the flow sensing channel surface around the flow surface. Therefore the surface of the flow sensor may be flush or level with the surface of the region around the flow sensor.

Alternatively, the surface that is substantially flat may be a second surface furthest from the first substrate and defined by the lid. Both the first and second surfaces of the flow sensing channel may be substantially flat to reduce turbulence.

The flow sensor assembly may further comprise one or more extension members laterally adjacent to the flow sensor. The extension members may be one or more separate components in physical contact with the flow sensor or may be one or more extended portions of the flow sensor itself.

The fluid flow sensor assembly may comprise the following elements: (i) a flow sensing die (or flow sensor) comprising a flow sensing surface comprising a flow sensing structure; (ii) a substrate; (iii) a lid; (iv) a flow inlet (or flow inlet channel); (v) a flow outlet (or flow outlet channel); (vi) means to reduce turbulences in proximity of the flow sensing surface of the flow sensing die; and (vii) a flow channel guiding the fluid from the flow inlet to the flow outlet. The flow channel results from the assembly of the elements (i) to (vi).

One or more of the flow inlet channel, the flow outlet channel, or the flow sensing channel may comprise one or more channel restrictors. The channel restrictors may be formed at any location within the flow channel. The term 'channel restrictors' is used to refer to restrictors located within the flow channel.

The flow sensing channel guiding the fluid from the inlet to the outlet results from the assembly of the lid on top of the substrate. The bottom face (or first surface) of the flow sensing channel may be formed by the extension member (which can be a filler material) and the flow sensing surface of the flow sensing die. Bond wires may be perpendicular to the fluid flow and positioned in such a way to reduce their interaction with the fluid flow and thus reduce the onset of unwanted turbulences.

The flow channel may have any cross-sectional geometry (e.g. square, rectangular, semi-circular, irregular etc.). The cross-section geometry may also vary along the length of the flow channel (e.g. the cross-section of the flow channel may be circular at the inlet and square at the flow sensing die section of the flow sensing channel).

A specific case of non-uniform flow channel cross-sectional area is using restrictors (i.e. the flow channel cross-sectional area is locally reduced). Restrictors may be placed at the flow inlet and flow outlet to reduce the effect on the flow sensing performance of the flow sensor assembly when integrated into the system using it. Restrictors may also be placed along the flow sensing channel in proximity of the flow sensing surface of the flow sensing die to locally increase the flow speed and thus improve the flow sensing performance.

Another specific case of non-uniform flow channel cross-sectional area is using reservoirs (i.e. the flow channel cross-sectional area is locally enlarged). Reservoirs may also be placed at the flow inlet and flow outlet or along the flow sensing channel. Also, the flow sensing channel may run straight from the inlet to the outlet, may have a serpentine shape from the inlet to the outlet or may have any other shape engineered to improve flow sensor assembly performance.

The extension member may comprise a filler material adjacent to the flow sensor and on the first substrate. The filler material or gel may extend across a remaining width of the flow sensing channel where the flow sensor is not present, and may have a substantially flat top surface across the width of the flow sensing channel. The filler material may extend to substantially the same height above the first substrate as the flow sensor height above the first substrate such that the flow sensor and the filler material together form a flat surface (the first surface of the flow sensing channel) across the entire length of the flow sensing channel. In other words the surface of the filler material may be flush with the surface of the flow sensor to form one flat surface throughout the entire length of the flow sensing channel.

The flow sensor assembly may further comprise a rim to retain the filler material. The rim may be an integral part of the first substrate, the lid, or may be a separate component of the flow sensor assembly.

The substrate may comprise a rim; and the rim may be integral part of the substrate. Alternatively, the rim may be an integral part of the lid or an additional element assembled onto the substrate as part of the flow sensor assembly process. As a result, a cavity between the rim and the flow sensing die is formed. To reduce turbulences in proximity to the flow sensing surface of the flow sensing die the cavity may be filled with a filler material. Depending on the filler deposition method, the surface topology of the filler may be concave or convex. Interestingly the filler material also protects the substrate bond pads and offers partial protection to the bond wires.

The filler material may be any material (e.g. a polymer, more specifically a gel, a resin, an epoxy, a ceramic, a metal, a semiconductor, or a combination of those) with suitable electrical, thermal, mechanical and chemical properties. The filler material is electrically insulating, thermally conductive, thermo-mechanically stable (i.e. does not expand or contracts in time and/or when exposed to varying temperatures), chemically stable (i.e. does not absorb, adsorb, desorb molecules in time). The filler material may be deposited (e.g. printed, syringe dispensed, sprayed, etc.) in ways compatible with the other elements forming the flow sensing assembly with high reproducibility. A curing step may be used to change the phase of the filler from fluid to solid.

The filler material may be configured such that it does not overlap an upper surface of the flow sensor. The filler material may have a concave or convex meniscus due to surface tension.

Alternatively, the filler material may slightly overlap the flow sensor when the flow sensor is heated up when in use. This may be achieved using a filler material with a concave or convex meniscus. Although the filler material may be configured to reduce the overlap between the filler material and the flow sensor in this case.

The flow sensor assembly may comprise bond wires electrically connected to the flow sensor, and the filler material may be configured to cover the bond wires. The filler material may fully encapsulate the bond wires; this reduces turbulence due to the bond wires. Alternatively, the filler material may partly encapsulate the bond wires and the bond wires may be configured to have reduced interaction with the fluid flow through the fluid flow sensor assembly.

Due to surface tension effects, the filler material may fully encapsulate the bond wires and the die bond PADs for extra protection.

The extension member may comprise an extension portion of the flow sensor. The extension portion may be an integral part of the flow sensor. The extension portion can be a region of a substrate and a dielectric layer, or could be other form of extension portion of a different type of flow sensor without a substrate and a dielectric layer.

The lid may define one or more apertures, and the flow inlet channel may comprise a channel through one of the apertures. The flow inlet channel may be configured to be substantially perpendicular to the flow sensing channel, and the extension member may extend underneath the flow inlet channel. The extension member may extend along the entire width of the inlet channel. These features allow fluid flow from the flow inlet channel to flow onto a substantially flat surface without disturbances when reaching the flow sensing channel.

Alternatively or additionally the flow outlet channel may comprise a channel through one of the apertures. The flow outlet channel may be configured to be substantially perpendicular to the flow sensing channel, and the extension member may extend underneath the flow outlet channel.

A top surface of the lid may be substantially flat such that the flow inlet channel and the flow outlet channel terminate on the top surface of the lid. The top surface may be defined as the exterior surface of the lid that extends in a lateral direction, substantially parallel to the flow sensing channel. The apertures or openings defining the flow inlet channel and the flow outlet channel may be flat.

Alternatively, the lid may comprise one or more protrusions on an outer surface of the lid, and the one or more apertures may extend through one or more of the protrusions. The protrusions may comprise hoses. The protrusions may extend away from the flow sensing channel.

The protrusions may be substantially perpendicular to the flow sensing channel, and the flow inlet channel and flow outlet channel may then be substantially perpendicular to the sensing channel. In this embodiment, fluid enters and exits the flow sensor in opposite directions.

Alternatively, the protrusions may be substantially parallel to the sensing channel, and the flow inlet channel and flow outlet channel may then be substantially parallel to the sensing channel. In this embodiment, fluid enters and exits the flow sensor in the same direction.

The flow sensor assembly may comprise a lid with a flow inlet and a flow outlet both comprising hoses to facilitate mechanical connection to the system using it. Hoses may have any geometry used to facilitate mechanical connection to the system using the flow sensor assembly. For instance, the hoses may have barbs, grooves, protrusions or a combination of those to enhance friction with the pipes or any other mean connected to them. The number, size and position within the flow sensor assembly of the inlet and the outlet might vary depending on the application requirements.

The first substrate and the lid may cooperate to define the flow inlet channel and the flow outlet channel. In other words, the flow inlet channel and the flow outlet channel may be defined by the cooperation of the shapes of the first substrate and the lid, and/or defined as a region between the first substrate and the lid either side of the flow sensing channel.

The flow inlet channel and the flow outlet channel may be defined on opposite surfaces of the flow sensor. In other words the flow inlet channel and flow outlet channel may be on opposite sides of the flow sensor such that fluid travels in one direction through the sensor. Fluid enters in same direction as it leaves, and therefore the sensor can be used in a continuous flow.

The lid further may comprise a lid restrictor, and the extension member may extend under the whole length of the lid restrictor. The term 'lid restrictor' is used to refer to a restrictor formed on the lid. The lid restrictor may be located on a lower surface of the lid. The lower surface of the lid may be defined as the surface of the lid that defines the flow sensing channel and is on the interior of the flow sensor assembly.

The lid may comprise a restrictor, placed along the flow channel in proximity of the flow-sensing surface of the flow-sensing die to locally increase the flow speed and thus improve the flow sensing performance. This may be used in applications where the flow sensor assembly is soldered on a surface over which a fluid is flowing, and the application requires measuring a property of the flowing fluid. This may be used in embodiment with a rim and filler material, or in embodiments where the extension member is an extended portion of the flow sensor.

The flow sensor assembly may further comprise an integrated circuit or circuitry located between the flow sensor and the first substrate. In other words, the first substrate, the integrated circuit, and the flow sensor may be formed in a stack in the order of first substrate, integrated circuit and flow sensor. In embodiments with filler material, the filler material may encapsulate the integrated circuit.

The flow sensor assembly may further comprise an integrated circuit or circuitry located laterally spaced from the flow sensor and over the first substrate, wherein the one or more extension members covers the integrated circuitry. In other words, the flow sensor and the integrated circuitry may be located side-by-side on the first substrate. The extension member may fully cover the integrated circuitry. In embodiments with filler material, the filler material may encapsulate the integrated circuit.

The flow sensor assembly may also comprises an integrated circuit (IC) die. The flow-sensing die may be stacked on top of the IC die to reduce the overall flow sensor assembly form factor. Alternatively, the flow sensing die and the IC die may be assembled side-by-side. In both cases, the filler material may offer protection to the IC die. The flow sensing die may be connected to the IC die directly through bond wires or indirectly through electrical connections through the substrate. The flow sensing die may have through silicon vias (TSV), to avoid the presence of bond wires and even further reduce the onset of unwanted turbulences. Advantageously, a flow sensor with TSV can help with 3D stacking techniques, whereby the flow sensing die sits on top of an IC (e.g. ASIC), thus reducing the sensor system size.

Alternatively or additionally, circuital blocks may be integrated on to the flow sensor itself. The membrane of the flow sensor may occupy a small area of the flow sensing surface, leaving a lot of area for monolithic integration of circuital blocks within the flow sensing die. Circuitry may comprise IPTAT, VPTAT, amplifiers, analogue to digital converters, digital to analogue converters, memories, RF communication circuits, timing blocks, filters or any other means for driving, readout, and electrical signals manipulation and communication to the outside world. For instance, in case of a thermal flow sensor, a heating element driven in constant temperature mode results in enhanced performance and having on-chip means to implement this driving method would result in a significant advancement of the state-of-the-art flow sensors. Also the driving method known a 3ω may be implemented via on-chip means, or any other driving method, such as constant temperature difference and time of flight, needed to achieve specific performance (e.g. power dissipation, sensitivity, dynamic response, range, fluid property detection, etc.).

The flow sensor may comprise: a sensor substrate comprising an etched portion; a dielectric layer located on the sensor substrate, wherein the dielectric layer may comprise at least one dielectric membrane located over the etched portion of the sensor substrate; and a sensing element located on or within the dielectric membrane. The sensing element may comprise a metal layer located within the dielectric membrane. The metal layer may comprise a heater, a temperature sensor or other type of sensing element used in a flow sensor.

The flow sensing die or flow sensor may comprise: a substrate comprising an etched portion; a dielectric region located on the substrate, wherein the dielectric region comprises a dielectric membrane over an area of the etched portion of the substrate; and means to sense one or more properties of the fluid (e.g. velocity, flow rate, exerted wall shear stress, absolute pressure, differential pressure, temperature, direction, thermal conductivity, diffusion coefficient, density, specific heat, kinematic viscosity, etc.). The flow sensing die may be a thermal flow sensor, and said means to sense one or more properties of the fluid may include heating elements and temperature sensors. The flow sensing die may be a mechanical flow sensor, and said means to sense one or more properties of the fluid may include piezo elements.

The starting substrate may be silicon, or silicon on insulator (SOI). However, any other substrate combining silicon with another semiconducting material compatible with state-of-the-art CMOS fabrication processes may be used. Employment of CMOS fabrication processes guarantees sensor manufacturability in high volume, low cost, high reproducibility and wide availability of foundries supporting the process. CMOS processes also enable on-chip circuitry for sensor performance enhancement and system integration facilitation.

The membrane or membranes may be formed by back-etching using Deep Reactive Ion Etching (DRIE) of the substrate, which results in vertical sidewalls and thus enabling a reduction in sensor size and costs. However, the back-etching may also be done by using anisotropic etching such as KOH (Potassium Hydroxide) or TMAH (TetraMethyl Ammonium Hydroxide) which results in sloping sidewalls. The membrane may also be formed by a front-side etch or a combination of a front-side and back-side etch to result in a suspended membrane structure, supported only by 2 or more beams. The membrane may be circular, rectangular, or rectangular shaped with rounded corners to reduce the stresses in the corners, but other shapes are possible as well.

The dielectric membrane may comprise of silicon dioxide and/or silicon nitride. The membrane may also comprise of one or more layers of spin on glass, and a passivation layer over the one or more dielectric layers. The employment of materials with low thermal conductivity (e.g. dielectrics) enables a significant reduction in power dissipation as well as an increase in the temperature gradients within the membrane with direct benefits in terms of sensor performance (e.g. sensitivity, frequency response, range, etc.).

The membrane may also have other structures made of polysilicon, single crystal silicon or metal. These structures may be embedded within the membrane, or may be above or below the membrane. More generally these structures can be also outside the membrane and/or bridging between inside and outside the membrane. Main purposes of said structures are: (i) to engineer the thermo-mechanical properties (e.g. stiffness, temperature profile distribution, etc.) of the membrane; (ii) to engineer the fluid dynamic interaction between the fluid and the membrane; (iii) to protect the membrane from undesired surface bleeding of the filler material. The structures can have any geometry, be made of any material suitable for the purposes (i) to (iii), and realised as part of the die manufacturing process or as part of the flow sensor assembly process.

The dielectric region may comprise a dielectric layer or a plurality of layers including at least one dielectric layer. Generally speaking, a dielectric membrane region may be located immediately adjacent to the etched portion of the substrate. The dielectric membrane region corresponds to the area of the dielectric region above (or below depending upon the configuration) the etched cavity portion of the substrate. For example, in a flip-chip configuration the dielectric membrane will be shown below the etched cavity portion of the substrate. Each dielectric membrane region may be over a single etched portion of the semiconductor substrate.

The flow sensor may comprise a passivation layer located on the dielectric layer.

A top surface of the passivation layer may be configured to be non-planar. The top surface of the passivation layer may be defined as the surface that is adjacent to the flow sensing channel or the flow sensing surface. The top surface of the passivation layer may comprise protrusions extending away from the dielectric layer. The protrusions may comprise walls or ridges. Stacks may be used within the dielectric layer to support the walls or ridges.

Walls may be present on the flow sensing surface of the flow sensing die. In case the filler material bleeds onto the flow sensing surface of the flow sensing die, the walls act as barrier for the filler material thus avoiding interaction of the filler material with the flow sensing structure of the flow sensing surface of the flow sensing die. The walls may be a by-product of a non-planarised fabrication process. For example, metal structures within a metal layer may be realised, resulting in a flow sensing surface with extrusions following the pattern of the metal structures within the metal layer. This effect may be further enhanced if metal structures are realised within different metal layers on top of each other.

A top surface of the passivation layer may comprises one or more grooves. The grooves, trenches or recesses may be etched portions of the passivation layer. These allow excess filler material to extend or bleed into the grooves, for example when the sensor assembly is heated in use. This reduces bleeding of the filler material over the membrane.

Grooves or recesses may present on the flow sensing surface of the flow sensing die. In case the filler material bleeds onto the flow sensing surface of the flow sensing die, the grooves act as an accumulation volume for the filler material. This avoids interaction of the filler material with the flow sensing structure of the flow sensing surface of the flow sensing die.

The protrusions of the passivation layer may be used as an alternative or in addition to the grooves within the passivation layer. This reduces bleeding of the filler material onto the dielectric membrane, which would reduce functionality of the flow sensor.

The dielectric membrane may define a through-hole. The through hole or aperture may extend through the membrane to allow fluid to flow through the flow sensor.

To facilitate the assembly process and reduce failures during soldering of the flow sensor assembly, the membrane may comprise through holes (or membrane cavity vent holes). The vent holes reduce any pressure increase within the membrane cavity that may result in membrane breakages, damage or stress.

The first substrate may define an aperture. The aperture of the first substrate and the through-hole of the dielectric membrane may form a hole through the flow sensor assembly.

The first substrate may have a vent hole or aperture. The vent hole reduces any pressure build up in the cavity underneath the membrane, thus reducing the risk of failure during packaging of the flow sensing die onto the substrate and during soldering of the flow sensor assembly onto a second substrate (e.g. a PCB).

One or more of the flow inlet channel, the flow outlet channel, and the flow sensing channel may comprise a protective layer. The protective layer may be a protective coating. The protective coating may be used on all flow channels, or only a top surface of the extension member forming the flow sensing channel, or may be formed on the whole flow sensor assembly. In embodiments where the first substrate has an aperture, the aperture may be coated with the protective coating.

The flow sensor assembly may further comprise bond pads located on an outer surface of the flow sensor assembly. The first substrate may comprise additional bond pads, referred to as internal bond pads. The flow sensor may comprise additional bond pads, referred to as die bond pads. The outer surface of the flow sensor assembly may be plastic, and the (outer) bond pads may be made of metal. The outer bond pads may form an electrical connection between the outer surface of the assembly and the internal bond pads of the lead frame (first substrate). The internal bond pads may form an electrical connection to the die bond pads through bond wires. In embodiments with a protective coating, the bond pads may be exposed and not covered with a protective coating.

The flow channel walls may be partly or fully covered and protected by a protective layer. The protective layer may be a conformal layer, thus following the topology of the flow channel walls. The bond wires may also be conformally coated by the protective layer. Anything else within the flow channel that in absence of the protective layer would be in contact with the fluid flow may also be conformally coated by the protective layer.

The entire flow sensor assembly (not only the flow channel walls) may be coated by the conformal protective layer.

Alternatively, the protective layer may be deposited at wafer level. In this case, only the flow sensing die would be protected by the protective layer.

The protective layer may also be deposited during or at the end of the assembly process. In these cases, only part of the flow sensor assembly or the entire flow sensor assembly would be protected by the protective layer.

The protective layer may protect fragile elements of the flow sensor assembly from aggressive media (e.g. aggressive liquids, corrosive gases, etc.) and also improve biocompatibility of the flow sensor assembly for example in medical applications and generally avoid direct interaction of some or all the elements forming the flow sensor assembly with the fluid under test and/or the environment.

According to a further aspect of the present disclosure, there is provided a method of manufacturing a flow sensor assembly, the method comprising: forming a first substrate; forming a flow sensor over the first substrate; forming a lid over the flow sensor; forming a flow inlet channel; forming a flow outlet channel, wherein a surface of the flow sensor and a surface of the lid cooperate to form a flow sensing channel between the flow inlet channel and the flow outlet channel; and wherein a surface of the flow sensing channel is substantially flat throughout the length of the flow sensing channel.

The method of manufacturing a flow sensor assembly may comprise: forming a substrate, forming a lid, assembly the flow sensing die on the substrate in such a way to minimise turbulences in proximity of the flow sensing surface of the flow sensing die, and assembly the lid.

BRIEF DESCRIPTION OF THE FIGURES

Some embodiments of the disclosure will now be described by way of example only and with reference to the accompanying drawings, in which:

FIG. 7 shows a schematic cross section of the flow sensor assembly with filler material having the inlet and outlet arranged parallel to the flow channel with a restrictor;

FIG. 8 shows a schematic cross section of the flow sensor assembly having the inlet and outlet arranged parallel to the flow channel with a restrictor;

FIG. 9 shows a schematic cross section of the flow sensor assembly with filler material protecting the bond wires;

DETAILED DESCRIPTION OF THE PREFERRED EMBODIMENTS

Some examples of the disclosed device are given in the accompanying figures.

Figure 1A:
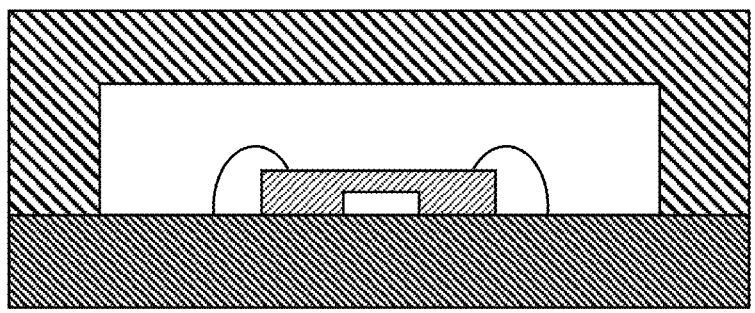
FIG. 1A shows a first flow sensor assembly according to the state-of-the-art.
Figure 1B:
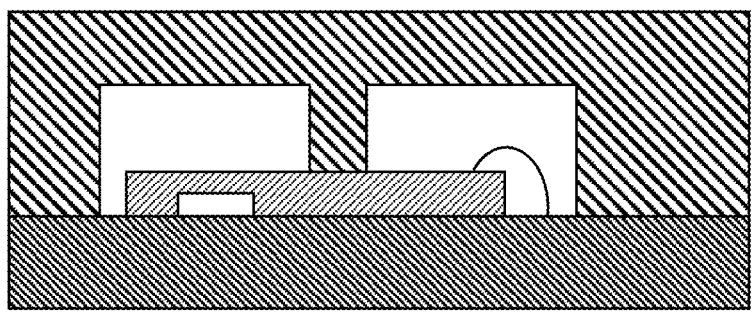
FIG. 1B shows a second flow sensor assembly according to the state-of-the-art.
Figure 1C:
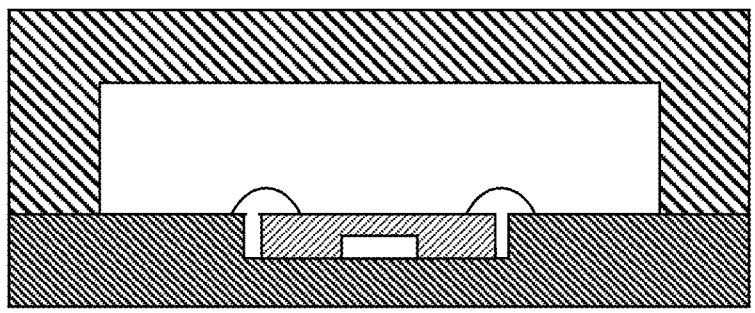
FIG. 1C shows a third flow sensor assembly according to the state-of-the-art.
Figure 1D:
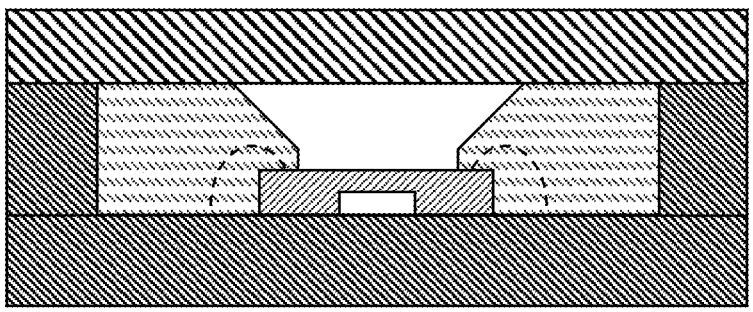
FIG. 1D shows a fourth flow sensor assembly according to the state-of-the-art.
Figure 2:
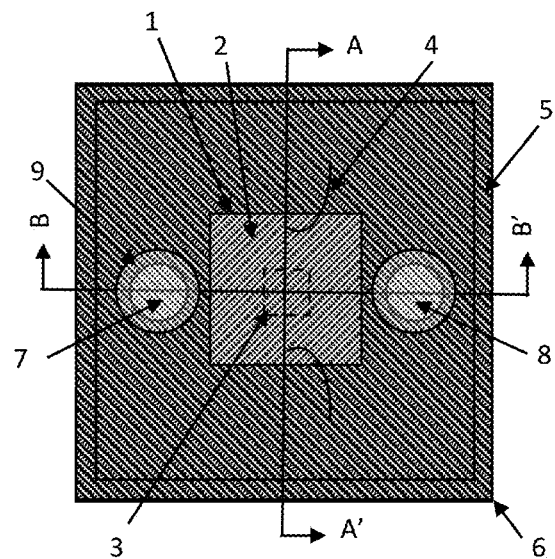
FIG. 2 shows a schematic top view of the flow sensor assembly.

FIG. 2 shows a schematic top view of the flow sensor assembly according to an embodiment of the disclosure, comprising a flow sensing die or flow sensor 1, comprising a flow sensing surface 2, comprising a membrane 3. The flow sensing die 1 is electrically connected to the substrate (first substrate) with bond wires 4. The substrate comprises a rim 5. The flow sensor assembly also comprises a lid 6, comprising an inlet or flow inlet channel 7 and an outlet or flow outlet channel 8, both comprising hoses 9.

Figure 3A:
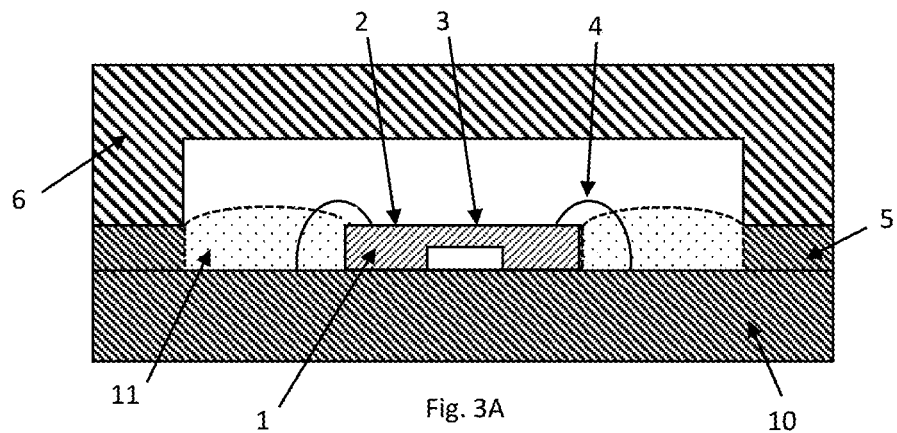
FIG. 3A shows a schematic cross-section of the flow sensor assembly with filler material along the A-A' cut line in FIG. 2.

FIG. 3A shows a schematic cross section of the flow sensor assembly of FIG. 2 along the cut line A-A' comprising a flow sensing die 1, comprising a flow sensing surface 2, comprising a membrane 3. The flow sensing die 1 is electrically connected to the substrate 10 with bond wires 4. The substrate 10 comprises a rim 5. The gap between the rim 5 and the flow sensing die 1 is filled with a filler material 11 with a convex surface topology. The flow sensor assembly also comprises a lid 6.

For connection, the flow sensor assembly has outer bond pads located on an outer surface of the flow sensor assembly. The substrate 10 also has bond pads, referred to as internal bond pads, and the flow sensor may comprise additional bond pads on the dielectric membrane, referred to as die bond pads. The outer bond pads form an electrical connection between the outer surface of the assembly and the internal bond pads of the substrate. The internal bond pads form an electrical connection to the die bond pads through the bond wires.

Figure 3B:
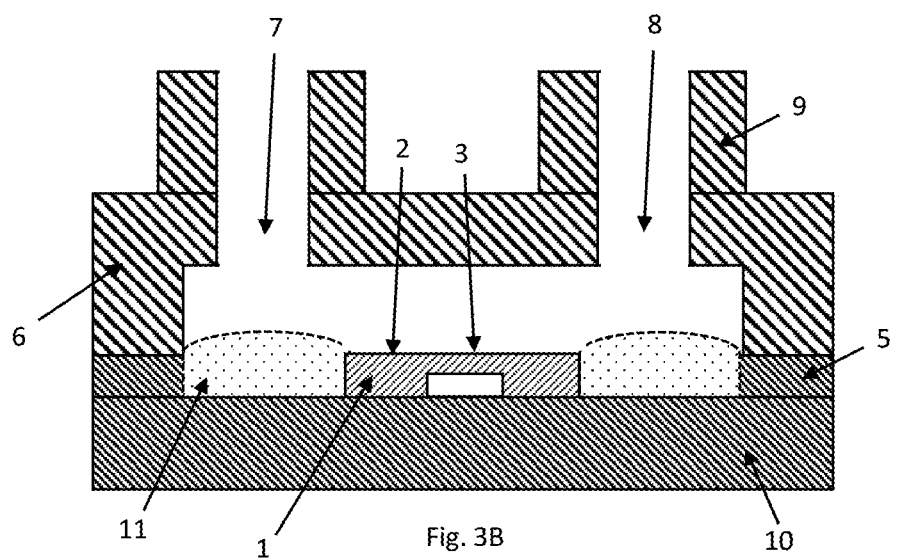
FIG. 3B shows a schematic cross-section of the flow sensor assembly with filler material along the B-B' cut line in FIG. 2.

FIG. 3B shows a schematic cross section of the flow sensor assembly of FIG. 2 along the cut line B-B' comprising a flow sensing die 1, comprising a flow sensing surface 2, comprising a membrane 3. The substrate 10 comprises a rim 5. The gap between the rim 5 and the flow sensing die 1 is filled with a filler material 11 with a concave or convex surface topology. The flow sensor assembly also comprises a lid 6, comprising an inlet 7 and an outlet 8, both comprising hoses 9.

In the embodiment shown in FIGS. 2, 3A, and 3B, the flow sensing die is assembled onto a substrate (e.g. a leadframe, a printed circuit board, or any other substrate mechanically supporting the die and offering an electrical connection from the die to the outside world). The substrate comprises a rim. The rim may be integral part of the substrate, integral part of the lid or an additional element assembled onto the substrate as part of the flow sensor assembly process. As a result, a cavity between the rim and the flow sensing die is formed. To reduce turbulences in proximity to the flow sensing surface of the flow sensing die the cavity is filled with a filler material. Depending on the filler deposition method, the surface topology of the filler may be concave or convex. The filler material also protects the substrate bond pads and offers partial protection to the bond wires.

The flow sensor assembly also has a lid with a flow inlet and a flow outlet both comprising hoses to facilitate mechanical connection to the system using it. Hoses may have any geometry that facilitate mechanical connection to the system using the flow sensor assembly. For instance, the hoses may have barbs, grooves, protrusions or a combination of those to enhance friction with the pipes or any other mean connected to them. The number, size and position within the flow sensor assembly of the inlet and the outlet might vary depending on the application requirements.

Figure 4:
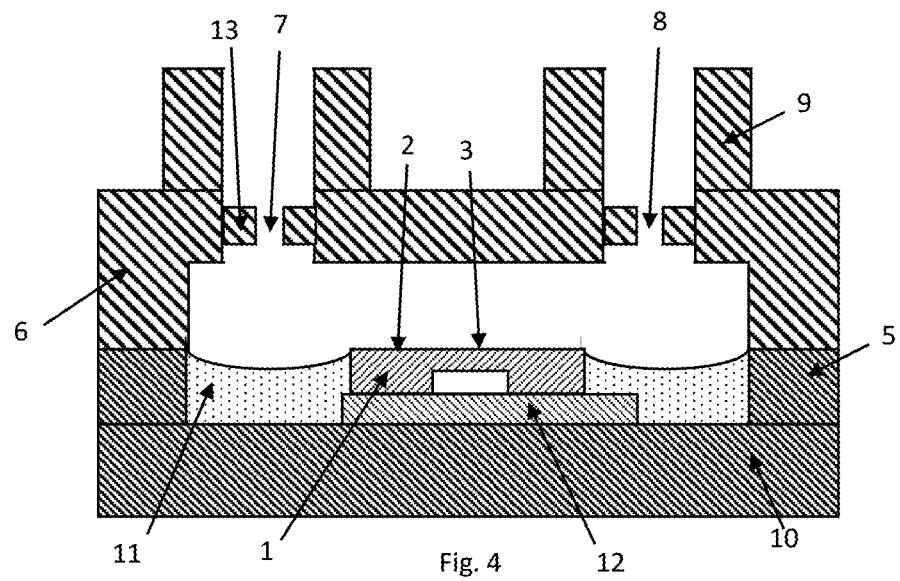
FIG. 4 shows a schematic cross section of the flow sensor assembly with filler material having the inlet and outlet comprising a restrictor and the flow sensing die stack on top of the ASIC.

FIG. 4 shows a schematic cross section of the flow sensor assembly according to an embodiment of the disclosure, in which the inlet and outlet both have a restrictor and the flow sensing die is stacked on top of the ASIC. The flow sensor assembly comprises a flow sensing die 1, comprising a flow sensing surface 2, comprising a membrane 3. The flow sensing die 1 is stack on top of an IC 12. The substrate 10 comprises a rim 5. The gap between the rim 5 and the flow sensing die 1 is filled with a filler material 11 with a concave surface topology. The flow sensor assembly also comprises a lid 6, comprising an inlet 7 and an outlet 8, both comprising hoses 9 and channel restrictors 13.

A non-uniform flow channel cross-sectional area is achieved by the use of restrictors (i.e. the flow channel cross-sectional area is locally reduced). Restrictors are placed at the flow inlet and flow outlet to reduce the effect on the flow sensing performance of the flow sensor assembly when integrated into the system using it.

The protrusions or hoses are substantially perpendicular to the flow sensing channel, and the flow inlet channel and flow outlet channel may then be substantially perpendicular to the sensing channel. In this embodiment, fluid enters and exits the flow sensor in opposite directions.

The flow sensing die is stacked on top of the IC die to reduce the overall flow sensor assembly form factor. Alternatively, the flow sensing die and the IC die may be assembled side-by-side, as shown in FIG. 3. In both cases the filler material offers protection to the IC die.

Figure 5:
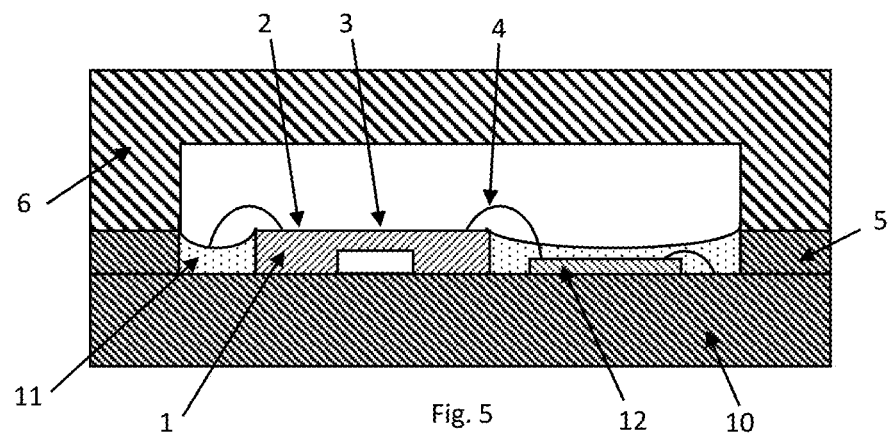
FIG. 5 shows a schematic cross section of the flow sensor assembly with filler material having the flow sensing die arranged side by side with the ASIC.

FIG. 5 shows a schematic cross section of the flow sensor assembly according to an embodiment of the disclosure, in which the flow sensing die is located laterally adjacent to an ASIC. The flow sensor assembly comprises a flow sensing die 1, comprising a flow sensing surface 2, comprising a membrane 3. The flow sensing die 1 is assembled side by side with an IC 12. The flow sensing die 1 is electrically connected to the IC 12 with bond wires 4. The IC is electrically connected to substrate 10. The substrate 10 comprises a rim 5. The gap between the rim 5 and the flow sensing die 1 is filled with a filler material 11 fully covering the IC 12. The flow sensor assembly also comprises a lid 6.

Figure 6:
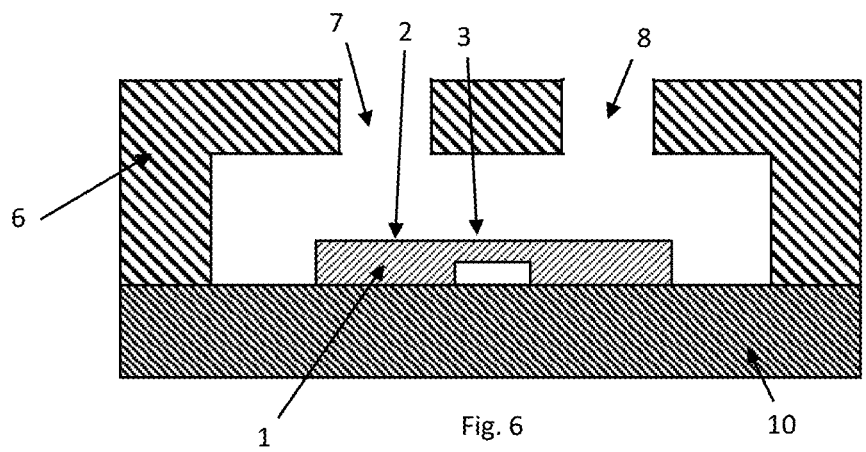
FIG. 6 shows a schematic cross section of the flow sensor assembly having the inlet and outlet on top of the flow sensing die.

FIG. 6 shows a schematic cross section of the flow sensor assembly according to an embodiment of the disclosure, in which the inlet and outlet both terminate of a top surface of the lid. The inlet 7 and outlet 8 are both located over the flow sensor 1 which has an integral extension portion to reduce turbulence. The flow sensor assembly comprises a flow sensing die 1, comprising a flow sensing surface 2, comprising a membrane 3. The flow sensor assembly also comprises a lid 6, comprising an inlet 7 and an outlet 8. The flow sensing die 1 comprises a flow sensing surface 2 extending underneath the inlet 7 and the outlet 8.

In FIGS. 3 to 6, the surface within or around the flow sensor may have a first region underneath the channel inlet 7, and a second region underneath the channel outlet 8, and the surface between the first and second region is substantially flat.

FIG. 7 shows a schematic cross section of the flow sensor assembly according to an embodiment of the disclosure, in which the inlet and outlet are arranged parallel to the flow sensing channel and the device has a lid restrictor. The flow sensor assembly comprises a flow sensing die 1, comprising a flow sensing surface 2, comprising a membrane 3. The substrate 10 comprises a rim 5. The gap between the rim 5 and the flow sensing die 1 is filled with a filler material 11. The flow sensor assembly also comprises a lid 6, comprising an inlet 7 and an outlet 8, and a lid restrictor 13.

In this embodiment, the flow sensor assembly comprises a flow sensing die, comprising a flow sensing surface, comprising a membrane. The flow sensor assembly also comprises a lid and a substrate with a rim. The flow sensing die is assembled on the substrate. As a result, a cavity between the rim and the flow sensing die is formed. To reduce turbulences in proximity of the flow sensing surface of the flow sensing die the cavity is filled with a filler material. The lid is assembled on the rim of the substrate.

The lid comprises a restrictor, placed along the flow channel in proximity of the flow sensing surface of the flow sensing die to locally increase the flow speed and thus improve the flow sensing performance. Upon assembly of the lid on the rim of the substrate a flow inlet, a flow outlet, and flow channel are created. The flow sensor assembly described in this embodiment is suitable in applications where the flow sensor assembly is soldered on a surface over which a fluid is flowing, and the application requires measuring a property of the flowing fluid.

FIG. 8 shows a schematic cross section of the flow sensor assembly according to an embodiment of the disclosure, in which the inlet and outlet arranged parallel to the flow channel, the device has a lid restrictor, and the flow sensor has an extension portion. The flow sensor assembly comprises a flow sensing die 1, comprising a flow sensing surface 2, comprising a membrane 3. The flow sensor assembly also comprises a substrate 10, a lid 6, comprising an inlet 7 and an outlet 8, and a restrictor 13.

In this embodiment, the flow sensor assembly comprises a flow sensing die, comprising a flow sensing surface, comprising a membrane. The flow sensor assembly also comprises a lid and a substrate. The flow sensing die and the lid are assembled on the substrate. The lid comprises a restrictor, placed along the flow channel in proximity of the flow sensing surface of the flow sensing die to locally increase the flow speed and thus improve the flow sensing performance by reducing the turbulences in proximity of the membrane on the flow sensing surface of the flow sensing die. Upon assembly of the lid on the rim of the substrate a flow inlet, a flow outlet, and flow channel are created. The flow sensor assembly described in this embodiment is suitable in applications where the flow sensor assembly is soldered on a surface over which a fluid is flowing, and the application requires measuring a property of the flowing fluid.

In FIGS. 7 & 8, the flow channel surface around the flow sensor, and in the entire region below the restrictor 13 is substantially flat. The two ends of the restrictor 13 act as a guide for the fluid into the flow channel, and so are the input and output points of the flow channel, and the surface below them is substantially flat.

FIG. 9 shows a schematic cross section of the flow sensor assembly according to an embodiment of the disclosure, in which filler material encapsulates and protects the bond wires. The flow sensor assembly comprises a flow sensing die 1, comprising a flow sensing surface 2, comprising a membrane 3. The flow sensing die 1 is electrically connected to the substrate 10 with bond wires 4. The substrate 10 comprises a rim 5. The gap between the rim 5 and the flow sensing die 1 is filled with a filler material 11 covering the bond wires 4. The flow sensor assembly also comprises a lid 6.

In this embodiment, the flow sensor assembly comprises a flow sensing die, comprising a flow sensing surface, comprising a membrane. The flow sensor assembly also comprises a lid and a substrate with a rim. The flow sensing die is assembled on the substrate. As a result, a cavity between the rim and the flow sensing die is formed. To reduce turbulences in proximity of the flow sensing surface of the flow sensing die the cavity is filled with a filler material. Due to surface tension effects, the filler material fully encapsulates the bond wires and the die bond PADs for extra protection. The lid is assembled on the rim of the substrate.

Figure 10:
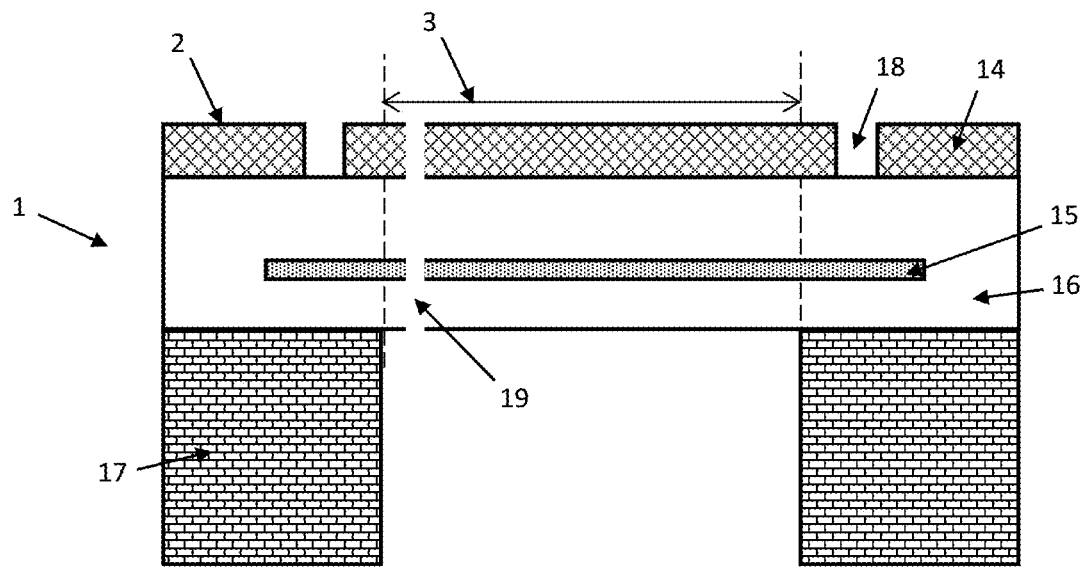
FIG. 10 shows a schematic cross section of the flow sensing die having grooves on the flow sensing die surface.

FIG. 10 shows a schematic cross section of the flow sensing die 1 that can be used in a flow sensor assembly according to an embodiment of the disclosure, in which the flow sensor 1 has grooves on the flow sensing die surface. The flow sensor 1 comprises a flow sensing surface 2, comprising a membrane 3. The flow sensing die 1 also comprises a passivation layer 14, a metal layer 15 acting as a sensing element embedded within a dielectric layer 16 and a die substrate 17 partly etched through to realise the membrane 3. The passivation layer 14 is also partly etch through to realise grooves 18 on the flow sensing surface 2. The membrane also comprises a through hole 19.

In this embodiment, grooves are present on the flow sensing surface of the flow sensing die. In case the filler material bleeds onto the flow sensing surface of the flow sensing die, the grooves act as an accumulation volume for the filler material. This avoids interaction of the filler material with the flow sensing structure of the flow sensing surface of the flow sensing die.

Figure 11:
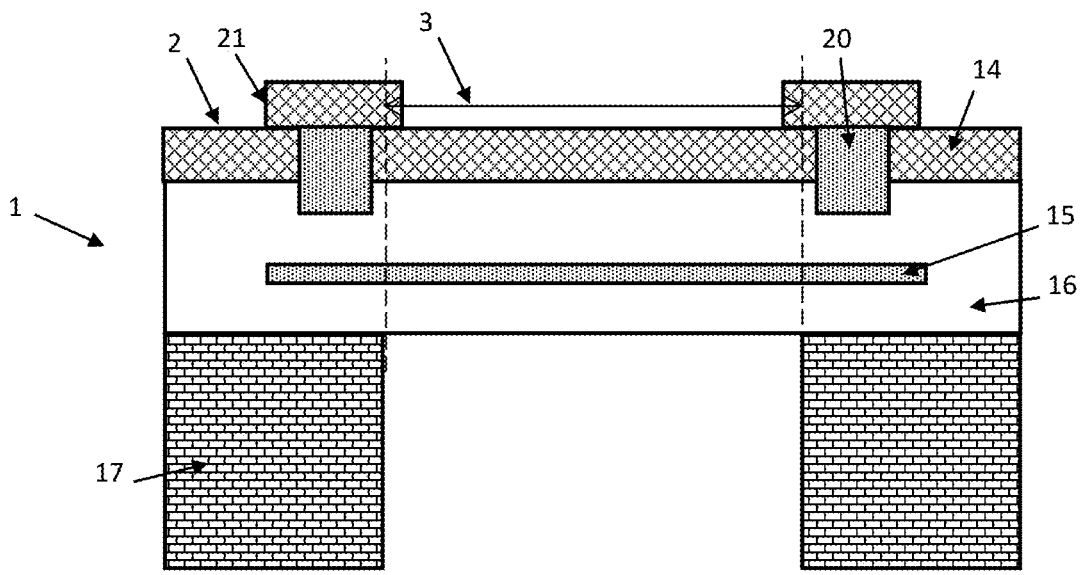
FIG. 11 shows a schematic cross section of the flow sensing die having walls on the flow sensing die surface.

FIG. 11 shows a schematic cross section of the flow sensing die 1 that can be used in a flow sensor assembly according to an embodiment of the disclosure, in which the flow sensor 1 has walls on the flow sensing die surface. The flow sensor 1 comprises a flow sensing surface 2, comprising a membrane 3. The flow sensing die 1 also comprises a passivation layer 14, a metal layer 15 embedded within a dielectric layer 16 and a die substrate 17 partly etched through to realise the membrane 3. The passivation layer 14 is also made non-planar by mean of metal stacks 20 to realise walls 21 on the flow sensing surface 2.

In this embodiment, walls are present on the flow sensing surface of the flow sensing die. In case the filler material bleeds onto the flow sensing surface of the flow sensing die, the walls act as barrier for the filler material thus avoiding interaction of the filler material with the flow sensing structure of the flow sensing surface of the flow sensing die. The walls may be a by-product of a non-planarised fabrication process. For example, metal structures within a metal layer may be realised, resulting in a flow sensing surface with extrusions following the pattern of the metal structures within the metal layer. This effect may be further enhanced if metal structures are realised within different metal layers on top of each other.

Figure 12:
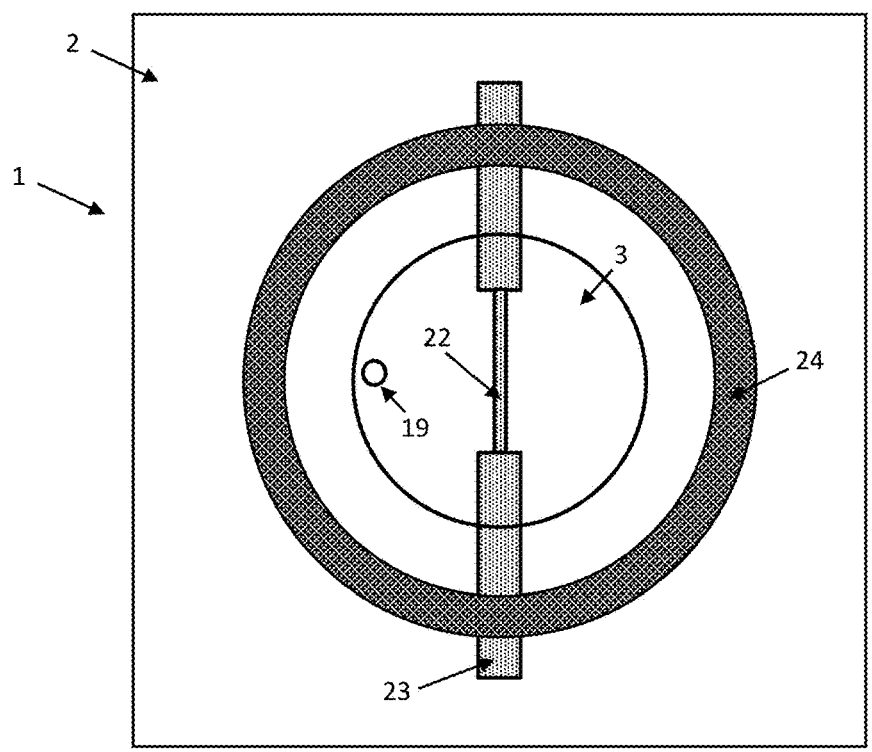
FIG. 12 shows a schematic top view of the flow sensing die having a structure (groove or wall) on the flow sensing die surface protecting the membrane from undesired surface bleeding of the filler material.

FIG. 12 shows a schematic top view of the flow sensing die 1 that can be used in a flow sensor assembly according to an embodiment of the disclosure, in which the flow sensor 1 has a structure (groove or wall) on the flow sensing die surface protecting the membrane from undesired surface bleeding of the filler material. The flow sensor 1 comprises a flow sensing surface 2, comprising a membrane 3. A wire heater 22 is embedded within membrane 3 and has tracks 23 connected to PADS (not shown for simplicity). The membrane also comprises a through hole 19. The flow sensing die 1 also comprises a structure 24 (made of grooves, walls or a combination of those) to avoid filler material bleeding onto the membrane 3.

Figure 13:
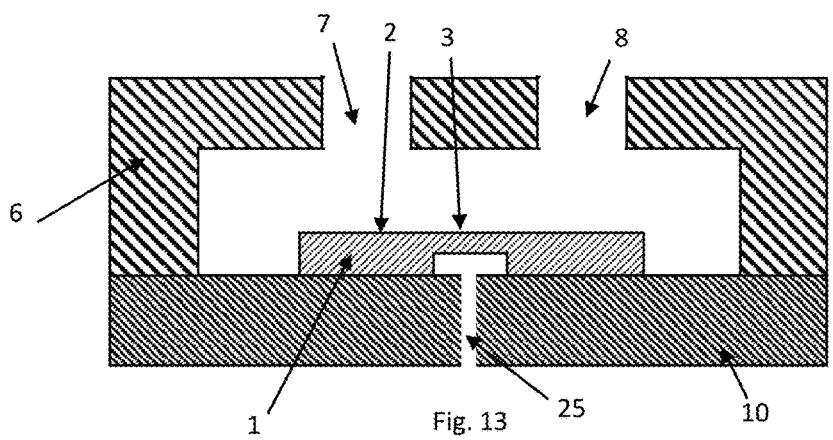
FIG. 13 shows a schematic cross section of the flow sensor assembly having the inlet and outlet on top of the flow sensing die and having a hole in the substrate underneath the membrane cavity.

FIG. 13 shows a schematic cross section of the flow sensor assembly according to an embodiment of the disclosure, in which the inlet and outlet are on top of the flow sensing die and the flow sensor assembly has a hole in the substrate underneath the membrane cavity. The flow sensor assembly comprises a flow sensing die 1, comprising a flow sensing surface 2, comprising a membrane 3. The flow sensor assembly also comprises a lid 6, comprising an inlet 7 and an outlet 8. The flow sensing die 1 comprises a flow sensing surface 2 extending underneath the inlet 7 and the outlet 8. The substrate 10 comprises a hole 25.

In this embodiment the substrate has a vent hole. The vent hole reduces pressure build up in the cavity underneath the membrane, thus reducing the risk of failure during packaging of the flow sensing die onto the substrate and during soldering of the flow sensor assembly onto a second substrate (e.g. a PCB).

Figure 14:
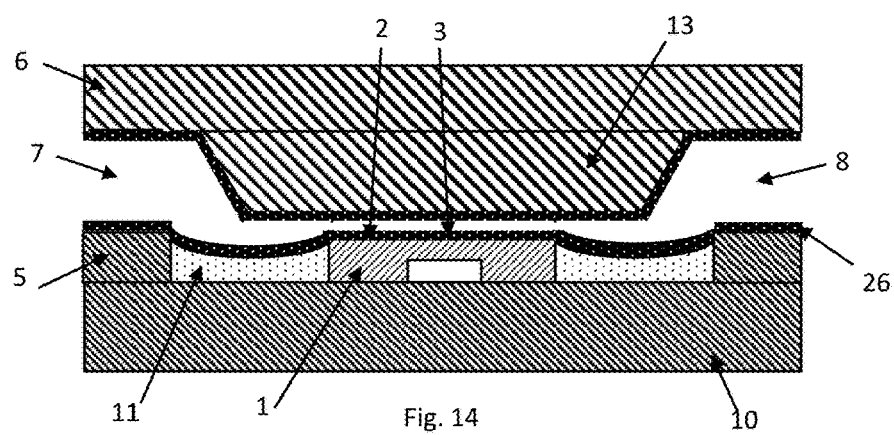
FIG. 14 shows a schematic cross section of the flow sensor assembly with filler material having the inlet and outlet arranged parallel to the flow channel with a restrictor and having a protecting layer on the walls of the flow channel.

FIG. 14 shows a schematic cross section of the flow sensor assembly according to an embodiment of the disclosure, in which the flow sensor assembly has a protecting layer on the walls of the flow channel. The flow sensor assembly comprises a flow sensing die 1, comprising a flow sensing surface 2, comprising a membrane 3. The substrate 10 comprises a rim 5. The gap between the rim 5 and the flow sensing die 1 is filled with a filler material 11. The flow sensor assembly also comprises a lid 6, comprising an inlet 7 and an outlet 8, and a restrictor 13. The flow channel, resulting from the assembly of the lid 6 with a restrictor 13 and the substrate rim 5 and the filler material 11 and the flow sensing surface 2, is protected by the protective layer 26.

The flow channel walls are partly or fully covered and protected by a protective layer. The protective layer is a conformal layer, thus following the topology of the flow channel walls. The bond wires may also be conformally coated by the protective layer. And anything else within the flow channel that in absence of the protective layer would be in contact with the fluid flow may also be conformally coated by the protective layer. The protective layer of this embodiment and of the embodiments shown in FIGS. 15 and 16 protects fragile elements of the flow sensor assembly from aggressive media (e.g. aggressive liquids, corrosive gases, etc.). The protective layer also improves biocompatibility of the flow sensor assembly for example in medical applications and generally reduces direct interaction of some or all the elements forming the flow sensor assembly with the fluid under test and/or the environment.

Figure 15:
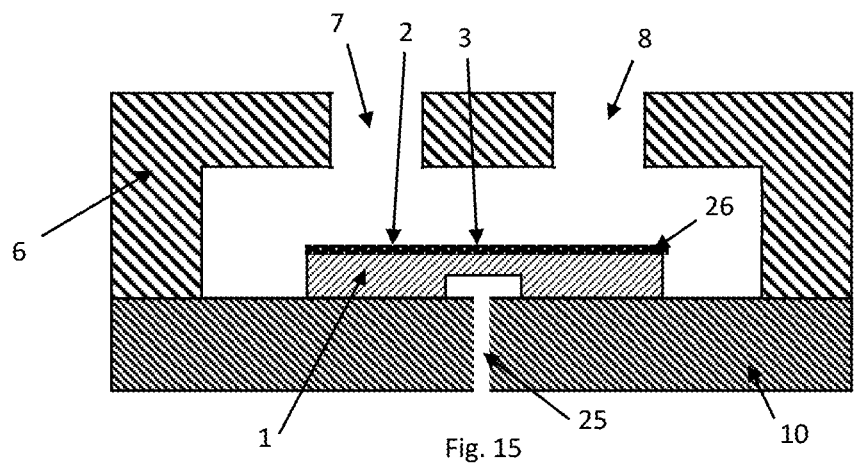
FIG. 15 shows a schematic cross section of the flow sensor assembly having the inlet and outlet on top of the flow sensing surface coated by a protective layer and having a hole in the substrate underneath the membrane cavity.

FIG. 15 shows a schematic cross section of the flow sensor assembly according to an embodiment of the disclosure, in which the flow sensor assembly has the flow sensing surface coated by a protective layer. The flow sensor assembly comprises a flow sensing die 1, comprising a flow sensing surface 2 with a protective layer 26, comprising a membrane 3. The flow sensor assembly also comprises a lid 6, comprising an inlet 7 and an outlet 8. The flow sensing die 1 comprises a flow sensing surface 2 extending underneath the inlet 7 and the outlet 8. The substrate 10 comprises a hole 25. In this embodiment, the protective layer may be deposited at wafer level. In this case, only the flow sensing die would be protected by the protective layer.

Figure 16:
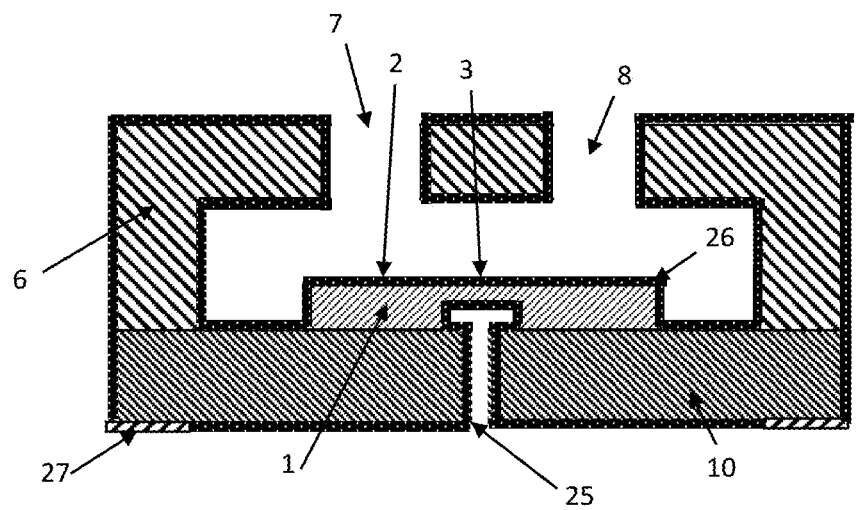
FIG. 16 shows a schematic cross section of the flow sensor assembly coated by a protective layer with only the soldering PADS left exposed.

FIG. 16 shows a schematic cross section of the flow sensor assembly according to an embodiment of the disclosure, in which the entire flow sensor assembly is coated by a protective layer with only the soldering outer bond PADS left exposed. The flow sensor assembly comprises a flow sensing die 1, comprising a flow sensing surface 2, comprising a membrane 3. The flow sensor assembly also comprises a lid 6, comprising an inlet 7 and an outlet 8. The flow sensing die 1 comprises a flow sensing surface 2 extending underneath the inlet 7 and the outlet 8. The substrate 10 comprises a hole 25. The flow sensor assembly also comprises a protective layer 26, coating the entire assembly and leaving exposed only the PADS 27. In this embodiment, the entire flow sensor assembly (not only the flow channel walls) may be coated by the conformal protective layer.

The skilled person will understand that in the preceding description and appended claims, positional terms such as 'above', 'overlap', 'under', 'lateral', etc. are made with reference to conceptual illustrations of an device, such as those showing standard cross-sectional perspectives and those shown in the appended drawings. These terms are used for ease of reference but are not intended to be of limiting nature. These terms are therefore to be understood as referring to a device when in an orientation as shown in the accompanying drawings.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the disclosure, whether alone or in any appropriate combination with any other feature disclosed or illustrated herein. Many other effective alternatives will occur to the person skilled in the art. It will be understood the disclosure is not limited to the described embodiments, but encompasses all the modifications which fall within the spirit and scope of the disclosure.

The invention claimed is:

1. A flow sensor assembly comprising:
   a first substrate;
   a flow sensor located over the first substrate;
   a lid located over the flow sensor;
   a flow inlet channel;
   a flow outlet channel, wherein a surface of the flow sensor and a surface of the lid cooperate to form a flow sensing channel between the flow inlet channel and the flow outlet channel;
   and wherein a first surface of the flow sensing channel is substantially flat throughout the length of the flow sensing channel, wherein the first surface comprises a surface of the flow sensor, and
   wherein the flow sensor assembly comprises a rim for retaining a filler material, wherein the rim is an integral part of the first substrate or the lid.

2. A flow sensor assembly according to claim 1, further comprising one or more extension members laterally adjacent to the flow sensor.

3. A flow sensor assembly according to claim 2, wherein the extension member comprises a filler material adjacent to the flow sensor and on the first substrate.

4. A flow sensor assembly according to claim 3, wherein the filler material is retained by the rim.

5. A flow sensor assembly according to claim 3, wherein the filler material is configured such that it does not overlap an upper surface of the flow sensor.

6. A flow sensor assembly according to claim 3, wherein the flow sensor assembly comprises bond wires electrically connected to the flow sensor, and wherein the filler material is configured to cover the bond wires.

7. A flow sensor assembly according to claim 3, wherein the filler material comprises a gel.

8. A flow sensor assembly according to claim 2, wherein the extension member comprises an extension portion of the flow sensor.

9. A flow sensor assembly according to claim 1, wherein one or more of the flow inlet channel, the flow outlet channel, or the flow sensing channel comprise one or more channel restrictors.

10. A flow sensor assembly claim 1, wherein the lid defines one or more apertures, and wherein the flow inlet channel comprises a channel through one of the apertures configured to be substantially perpendicular to the flow sensing channel, and wherein the extension member extends underneath the flow inlet channel.

11. A flow sensor assembly according to claim 10, wherein the lid comprises one or more protrusions on an outer surface of the of the lid, and
   wherein the one or more apertures extend through one or more of the protrusions.

12. A flow sensor assembly according to claim 1, wherein the first substrate and the lid cooperate to define the flow inlet channel and the flow outlet channel; and
   optionally wherein the lid further comprises a lid restrictor, and wherein the extension member extends under the whole length of the lid restrictor.

13. A flow sensor assembly according to claim 1, further comprising an integrated circuit located between the flow sensor and the first substrate; and/or
   further comprising an integrated circuit located laterally spaced from the flow sensor and over the first substrate, wherein the one or more extension members covers the integrated circuitry.

14. A flow sensor assembly according to claim 1, wherein the flow sensor comprises:
   a sensor substrate comprising an etched portion;
   a dielectric layer located on the sensor substrate, wherein the dielectric layer comprises at least one dielectric membrane located over the etched portion of the sensor substrate; and
   a sensing element located on or within the dielectric membrane.

15. A flow sensor assembly according to claim 14, wherein the flow sensor comprises a passivation layer located on the dielectric layer.

16. A flow sensor according to claim 15, wherein a top surface of the passivation layer is configured to be non-planar; and
   optionally wherein a top surface of the passivation layer comprises one or more grooves.

17. A flow sensor according to claim 14, wherein the membrane defines a through-hole.

18. A flow sensor assembly according to claim 1, wherein the first substrate defines an aperture.

19. A flow sensor assembly according to claim 1, wherein one or more of the flow inlet channel, the flow outlet channel, and the flow sensing channel comprise a protective layer.

20. A flow sensor assembly according to claim 1, further comprising bond pads located on an outer surface of the flow sensor assembly.

21. A flow sensor assembly according to claim 1, wherein a surface of the flow sensor is level with a surface of a region around the flow sensor.

22. A flow sensor assembly according to claim 1, wherein corners of the flow sensor are located outside the flow sensing channel.

23. A flow sensor assembly according to claim 1, wherein the rim is an integral part of the first substrate.

24. A method of manufacturing a flow sensor assembly, the method comprising:
   forming a first substrate;
   forming a flow sensor over the first substrate;
   forming a lid over the flow sensor;
   forming a flow inlet channel;
   forming a flow outlet channel, wherein a surface of the flow sensor and a surface of the lid cooperate to form a flow sensing channel between the flow inlet channel and the flow outlet channel;
   and wherein a first surface of the flow sensing channel is substantially flat throughout the length of the flow sensing channel, wherein the first surface comprises a surface of the flow sensor, and
   wherein the flow sensor assembly comprises a rim for retaining a filler material, wherein the rim is an integral part of the first substrate or the lid.

* * * * *